United States Patent
Kizuka et al.

(10) Patent No.: US 8,277,192 B2
(45) Date of Patent: Oct. 2, 2012

(54) TURBINE BLADE

(75) Inventors: Nobuaki Kizuka, Hitachinaka (JP); Hidetaro Murata, Hitachi (JP); Hidetoshi Kuroki, Hitachi (JP); Kenji Nanataki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1013 days.

(21) Appl. No.: 12/018,521

(22) Filed: Jan. 23, 2008

(65) Prior Publication Data

US 2008/0240924 A1    Oct. 2, 2008

(30) Foreign Application Priority Data

Feb. 28, 2007 (JP) .................... 2007-049931

(51) Int. Cl.
*F01D 5/14* (2006.01)

(52) U.S. Cl. .............. 416/223 R; 416/242; 416/243; 416/DIG. 2

(58) Field of Classification Search .......... 416/223 R, 416/242, 243, DIG. 2
See application file for complete search history.

(56) References Cited

U.S. PATENT DOCUMENTS

| | | | |
|---|---|---|---|
| 4,900,230 A * | 2/1990 | Patel | 416/223 A |
| 5,035,578 A * | 7/1991 | Tran | 416/223 A |
| 6,638,021 B2 | 10/2003 | Olhofer et al. | |
| 6,715,990 B1 | 4/2004 | Arness et al. | |

FOREIGN PATENT DOCUMENTS

| | | |
|---|---|---|
| EP | 0 887 513 A2 | 12/1998 |
| JP | 05-87201 | 11/1993 |
| JP | 2002-138801 | 5/2002 |
| JP | 2004-108369 | 4/2004 |

OTHER PUBLICATIONS

Japanese Official Action dated Apr. 21, 2009.
"Integrated Cae System for Cooled Turbine Blade Design and Verification Tests of Analytical Codes" by Kawaike, et al.

* cited by examiner

*Primary Examiner* — Edward Look
*Assistant Examiner* — Jesse Prager
(74) *Attorney, Agent, or Firm* — Brundidge & Stanger, P.C.

(57) ABSTRACT

An airfoil profile is formed such that a passage width ratio, represented in a dimensionless manner, of an inter-blade passage width of vane root cross-section to an outlet throat width substantially monotonously decreases from a blade inlet toward a blade outlet. The blade has a blade airfoil profile shape in an envelope within a range of .+-.2.0 mm in a direction normal to any surface location of an airfoil profile portion. The airfoil profile portion has a reference airfoil contour represented in Cartesian coordinates wherein Z is a distance representing a sectional height from a root of the airfoil profile portion. The contours represented by X and Y at each section Z are joined smoothly with one another in a blade height direction to form a complete shape of the airfoil profile portion.

9 Claims, 5 Drawing Sheets

TURBINE BLADE

BACKGROUND OF THE INVENTION

1. Field of the Invention

The present invention relates to a turbine blade for a gas turbine and particularly to an improvement in an airfoil profile of a first stage turbine blade.

2. Description of the Related Art

A gas turbine of this type that has generally been adopted is configured such that working fluid compressed by a compressor is added with fuel and burned to provide high-temperature and high-pressure working fluid, which drives a turbine. The rotational energy of the turbine thus driven is usually converted into electric energy by a generator coupled to the turbine.

In recent years, more expectations have been placed on improvements in the efficiency of a gas-turbine-and-steam-turbine-combined cycle. It has been intended as one of the means to further increase the temperature and pressure of the working fluid.

As regards a high-temperature turbine component, particularly, a first stage turbine blade, efforts have been made to provide an optimum shape with respect to aerodynamic performance as well as to reinforce a cooling structure in order to deal with increased high-temperature and high-pressure. For example, a shape of a first stage blade in airfoil-profile-height central cross-section is disclosed in a non-patent document, K. Kawaike, et. al.: Integrated CAE System for Cooled Turbine Blade Design and Verification Tests of Analytical Codes: R. J. Goldstein, et. al., Proceedings of International Symposium Heat Transfer in Turbomachinery, Begall House, Inc. 1992.

Incidentally, JP-A-2004-108369 discloses one of the first stage airfoil profiles of a gas turbine blade.

SUMMARY OF THE INVENTION

Figure 6:
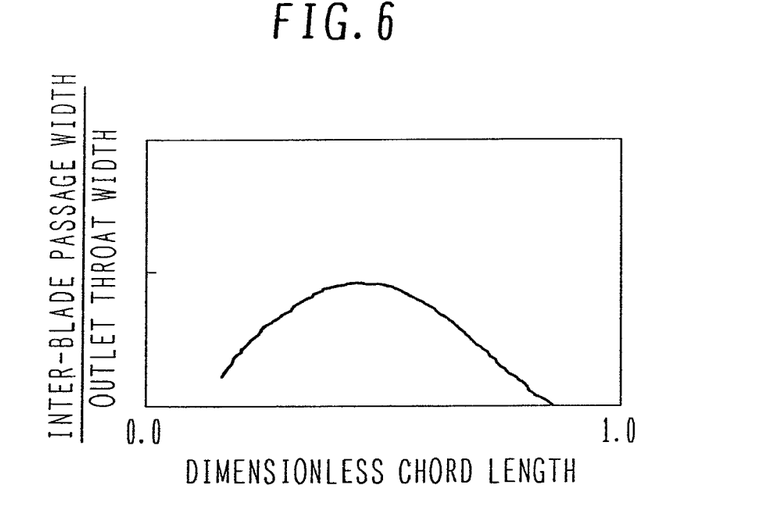
FIG. 6 illustrates an inter-blade passage width ratio of a conventional blade.

FIG. 6 illustrates an inter-blade passage width of a blade root cross-section in a dimensionless manner with respect to a trailing edge throat width (an outlet throat width) in the case where it is formed on the basis of the airfoil profile of the first stage blade observed in the above non-patent document. The inter-blade passage width formed in such an airfoil is generally formed so as to monotonously increase from a blade inlet once, reach a peak and then monotonously decrease toward an outlet. The narrowest place in passage width is hydrodynamically called a throat. The inter-blade passage width mentioned above has two places, a passage inlet and outlet, where their passage widths are each narrowed, which is hydrodyanamically called a double-throat. This will cause disturbed flows.

Incidentally, the divisional plane of the circumferential segment of a blade may be formed parallel to a rotor disk rotating shaft used to secure the blade thereto. In such a case, also insertion grooves are formed parallel to the rotor disk rotating shaft; therefore, they can easily be machined. This method is called an axial entry method, which makes blade assembly work easiest.

Figure 7:
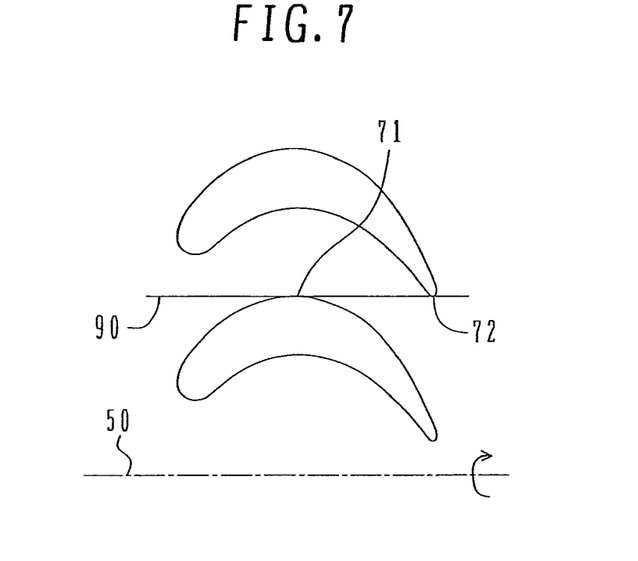
FIG. 7 illustrates segment division of the blade.

However, when a circumferential segment divisional plane 90 of a blade as shown in FIG. 7 is formed parallel to a rotor disk rotating shaft (turbine rotating shaft) 50, a peak 71 of the airfoil back-side profile of a blade-root cross-section and a lowest point 72 of the airfoil ventral-side profile adjacent thereto must be formed not to overlap each other. This imposes a large limitation on airfoil design. Because of this limitation, the cross-section of the airfoil profile is generally such that the back-side peak is suppressed not to exceed the segment divisional plane 90, thus forming a round-shouldered, sublunate shape. Consequently, a double-throat is likely to be formed.

Figure 8:
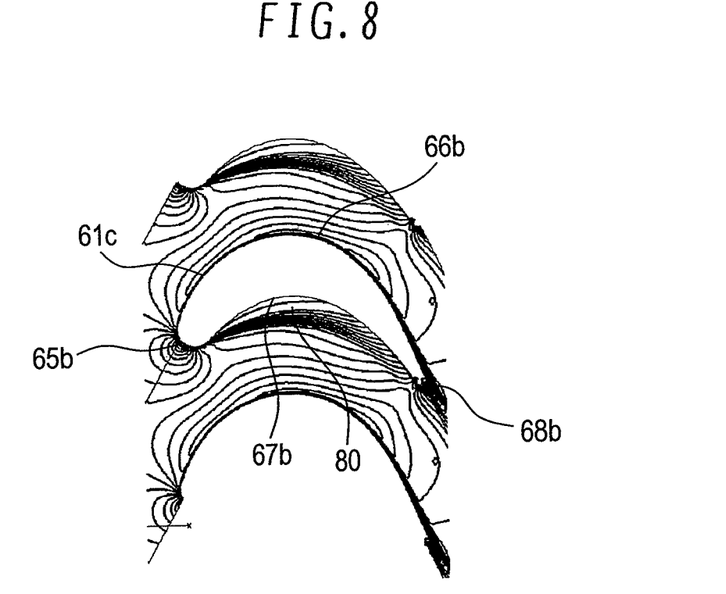
FIG. 8 illustrates the results of inter-blade flow analysis with respect to a conventional blade.

FIG. 8 illustrates the results of flow analysis on the inter-blade passage configured on the basis of the airfoil profile of the conventional first blade. The passage width monotonously increases from a blade inlet to expand flow, thereby weakening restraint of the flow. Thus, extensive separation of flow 80 from the ventral surface 67b of the airfoil profile 61c occurs to increase an aerodynamic loss. Incidentally, reference numeral 65b denotes a leading edge, 66b denotes a back surface and 68b denotes a trailing edge.

It is an object of the present invention to provide a first stage blade of a turbine blade having an aerodynamically optimum airfoil profile that suppresses separation of flow from a blade ventral surface.

In the present invention, an airfoil profile is formed such that a passage width ratio, represented in a dimensionless manner, of an inter-blade passage width of vane root cross-section to a trailing edge throat width (an outlet throat width) substantially monotonously decreases from a blade inlet toward a blade outlet. In this case, "substantially" means that a ratio of an inter-blade peak passage width ratio to a passage width ratio at the blade inlet is set to 1.05 or less. This is intended to avoid an influence caused by the inter-blade passage width which monotonously increases once on the blade inlet side.

According to an aspect of the present invention, there is provided a turbine blade having a blade airfoil profile shape in an envelope within a range of ±2.0 mm in a direction normal to any surface location of an airfoil profile portion, wherein the airfoil profile portion has a reference airfoil contour represented in Cartesian coordinates of X, Y and Z set forth in Tables 1 through 7 wherein the X, Y and Z are distances in millimeters and the Z is a distance representing a sectional height from a root of the airfoil profile portion, contours represented by the X and Y at each section Z being joined smoothly with one another in a blade height direction to form a complete shape of the airfoil profile portion.

According to another aspect of the present invention, there is provide a turbine blade having a non-coated reference airfoil contour portion represented in Cartesian coordinates of X, Y and Z set forth in Tables 1 through 7, wherein an airfoil profile portion of the turbine blade has a reference contour represented in the Cartesian coordinates of X, Y and Z set forth in Tables 1 through 7 wherein the X, Y and Z are distances in millimeters and the Z is a distance representing a sectional height from a root of the airfoil profile portion, contours represented by the X and Y at each section Z being joined smoothly with one another in a blade height direction to form a complete shape of the airfoil profile portion. The X, Y and Z are scalable upwardly or downwardly as a function of the same constant or number to provide an upwardly or downwardly scaled airfoil profile portion.

Preferably, the root radius of the airfoil profile portion of the blade is 493.9 mm, the height of the airfoil profile portion of the blade from the root radius is 77.1 mm, each of the root radius and the height of the airfoil profile portion has a tolerance of ±2.0 mm, and the turbine rotating body of the first stage blade is formed of eighty-two blades.

The present invention can provide an aerodynamically optimal airfoil profile that can enhance the performance of the entire gas turbine. Specifically, in the first stage turbine blade, the inter-blade passage width is formed to substantially monotonously decrease from the blade inlet toward the blade outlet. It is therefore possible to prevent flow separation from the ventral surface of the airfoil profile which otherwise occurs because the passage width monotonously increases to expand the flow, thereby weakening restraint of the flow. Thus, an aerodynamic loss can be reduced. The present invention can provide an aerodynamically optimal airfoil profile that can eliminate flow separation from the blade ventral surface, particularly, in the first stage turbine blade adopting the axial entry method.

DETAILED DESCRIPTION OF THE PREFERRED EMBODIMENTS

Figure 1:
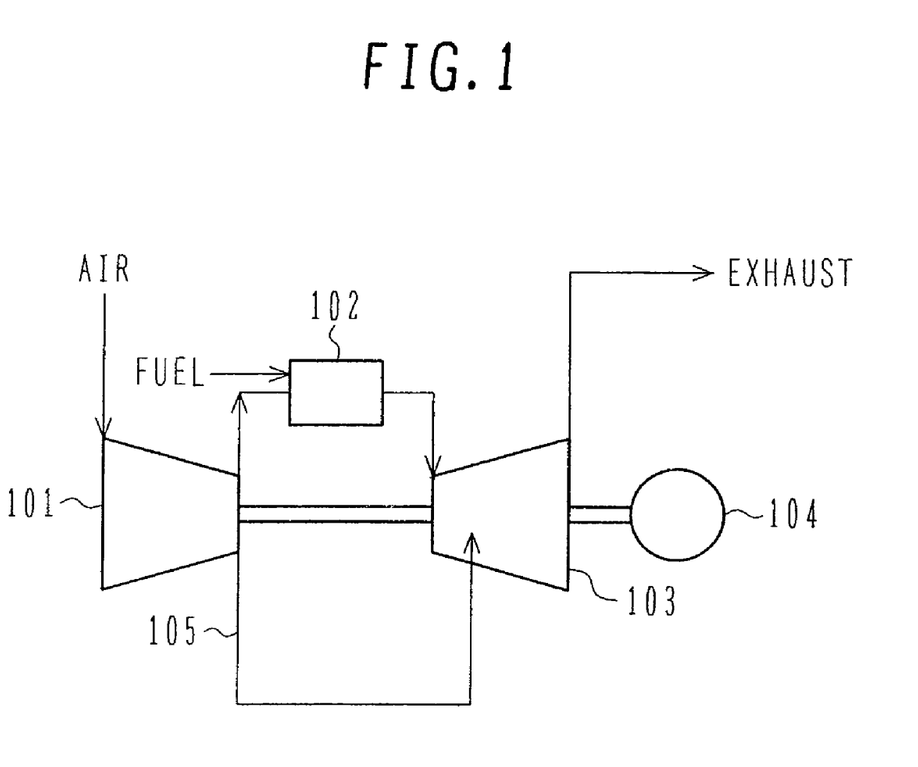
FIG. 1 illustrates the entire system of a gas turbine on which a blade according to an embodiment of the present invention is mounted.

An embodiment of the present invention will hereinafter be described in detail with reference to the drawings. FIG. 1 illustrates the basic configuration of a gas turbine embodying the present invention. Air compressed by a compressor 101 is supplied to a combustor 102. The combustor 102 burns fuel fed along with the compressed air to generate drive fluid with high temperature and high pressure. A turbine 103 is driven by this drive fluid, whereby electric power is taken out from a generator 104 or a load. The drive fluid that performed its function in the turbine 103 is discharged as exhaust gas to the outside. The stator blades and blades of the turbine 103 are forcibly cooled by air 105 taken out of the compressor 101 to lower the metal temperature of blade material to an acceptable value or less.

Figure 2:
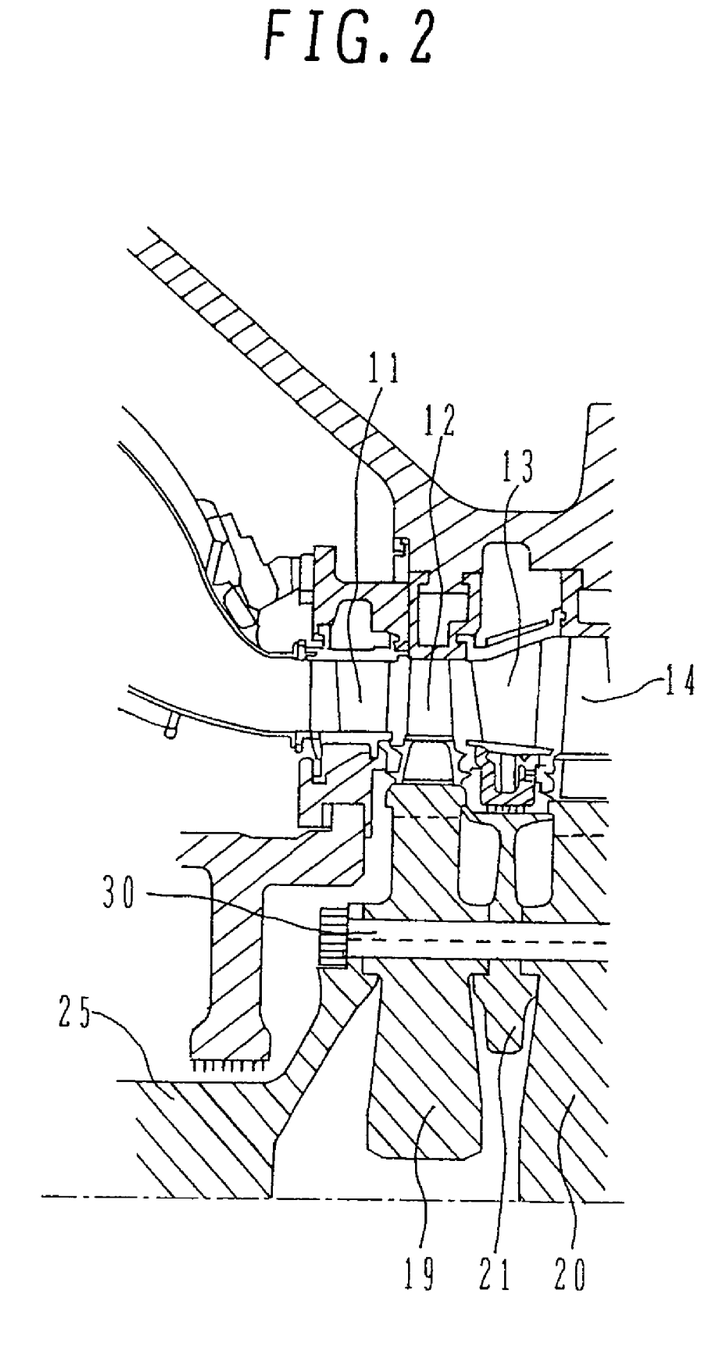
FIG. 2 is a cross-sectional view of an essential portion of the turbine on which the blade of the embodiment is mounted.

FIG. 2 is a cross-sectional view of an essential portion (blade stage portion) of the turbine 103. A mainstream gas which is the drive fluid with high temperature and high pressure is led to the inside of the turbine 103 from the exit of the combustor 102. The mainstream gas sequentially flows down through a first stage consisting of a first stage stator blade 11 and a first stage blade 12 and through a second stage consisting of a second stage stator blade 13 and a second stage blade 14 to drive the first blade 12 and the second blade 14.

The first stage blade 12 is secured to a first stage rotor disk 19, and the second stage blade 14 is secured to a second stage rotor disk 20. A disk spacer 21 is located between the first stage rotor disk 19 and the second stage rotor disk 20 so as to positionally correspond to the second stage stator blade 13. A distant piece 25 is secured integrally with the first stage rotor disk 19, the disk spacer 21, the second stage rotor disk 20 and a stub shaft 30. These turbine components form a rotating body as a rotor member.

The operating principle of the gas turbine is briefly described. The drive fluid caused by the compressor 101 and the combustor 102 to have high temperature and high pressure, that is, the mainstream gas, converts its high-pressure energy into flow velocity energy by the first stage stator blade 11 and second stage stator blade 13 constituting the turbine 103 to rotate the first stage blade 12 and the second stage blade 14, respectively. This rotational energy drives the generator 104 to provide electric power. A portion of the rotational energy is also used to drive the compressor 101. In general the combustion temperature of the turbine 103 varies depending on the heatproof temperature of the heat-resistant material of the gas turbine. However, the combustion temperature of the turbine 103 is set so as to achieve high efficiency in combination with a steam turbine. In the usual electricity-generating gas turbine, a range of 1200° C. to 1500° C. is selected; on the other hand, a pressure ratio of about 15 to 20 is selected. In this case, the mainstream gas has a temperature equal to or higher than the allowable temperatures of the blade materials of the first stage stator blade 11, the second stage stator blade 13, the first stage blade 12 and the second stage blade 14. It is therefore necessary to forcibly cool them by air 105 extracted from the compressor 101 and lower the metal temperatures of the blade materials to allowable values or less.

Figure 3:
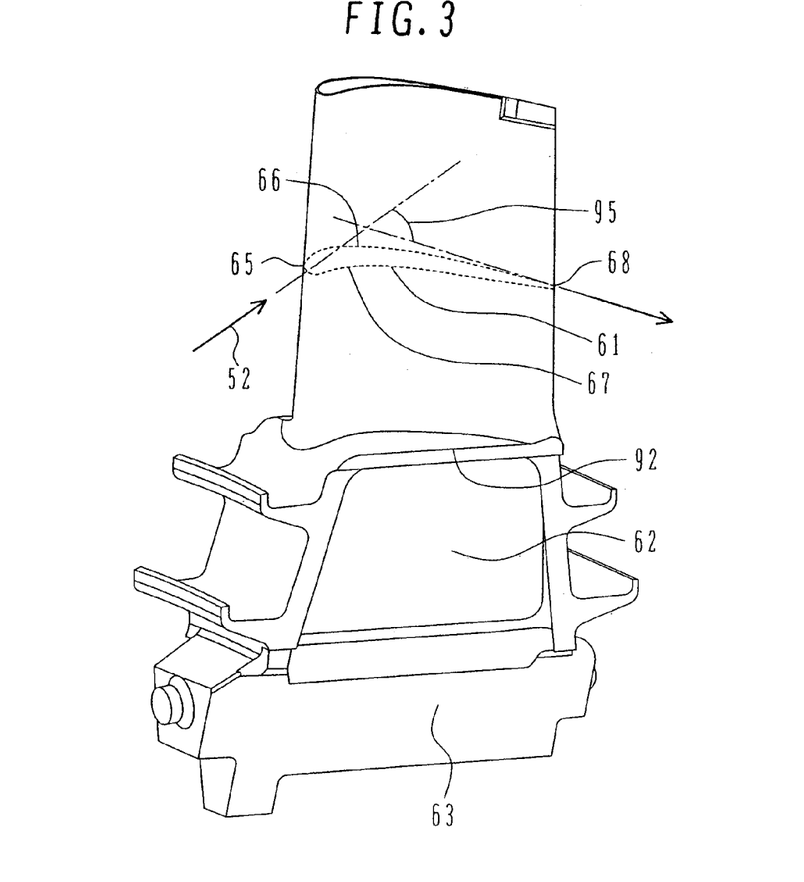
FIG. 3 is a perspective view of the blade of the embodiment.

FIG. 3 illustrates the first stage blade 12 of the present embodiment. The first stage blade 12 is composed of an airfoil profile portion 61 located on the path of the mainstream gas, a shank portion 62, and a dovetail portion 63 holding the blade on the first stage rotor disk 19. A cooling passage is formed inside the first stage blade 12 to cool the blade although not shown in the diagram. The airfoil profile portion 61 is formed of a leading edge 65 located on the uppermost stream as viewed from a mainstream gas inflow direction 52, a back side 66 located on a left-side protruding surface, a ventral side 67 located on a right-side recessed surface, and a trailing edge 68 located on the lowermost stream. There are eighty-two first stage blades circumferentially mounted to the first stage rotor disk 19 to constitute a first stage blade rotor. A blade segment divisional plane 92 of the first stage blade 12 is formed parallel to the rotor disk rotating shaft. The inserting direction of the first stage blade 12 into the rotor disk is also formed parallel to the rotor disk rotational axis. In this way, an axial entry method is adopted.

As regards the airfoil profile portion 61, a turning angle 95 adapted to change the direction of the drive fluid tends to increase in order to allow the mainstream gas with high temperature and high pressure to perform its function in an optimal manner. Also, the turning angle increases from a blade tip to a blade root because of the radial distribution of circumferential velocity. Thus, in general the turning angle is the largest at a blade root section. If the axial entry method is adopted, the difficulty level of designing the airfoil avoiding a double throat is high.

Figure 4:
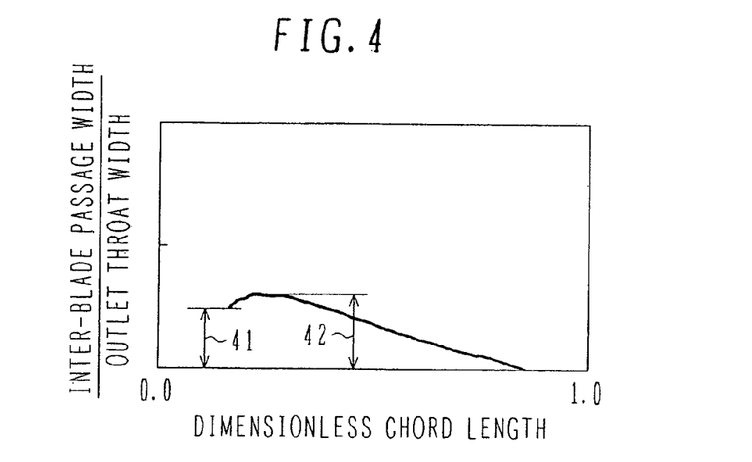
FIG. 4 illustrates an inter-blade passage width ratio of the blade of the embodiment.

Next, FIG. 4 illustrates an inter-blade passage width of a blade root cross-section represented in a dimensionless manner with respect to a trailing end throat width in the case where it is formed on the basis of the airfoil profile of the first stage blade 12 according to the embodiment. As is similar to the conventional example, the blade of the present embodiment is such that the inter-blade passage width monotonously increases once and subsequently decreases; however, a peak value itself is suppressed. In other words, the inter-blade passage width substantially monotonously decreases from the vane inlet to the vane outlet. Preferably, a ratio of a peak inter-blade passage width ratio 42 between blades to an intervene passage width ratio 41 of the blade inlet is 1.5 or less experimentally in order to suppress flow separation from the blade profile ventral side. The blade of the present embodiment suppresses the ratio to about 1.04, which satisfies the condition.

Figure 5:
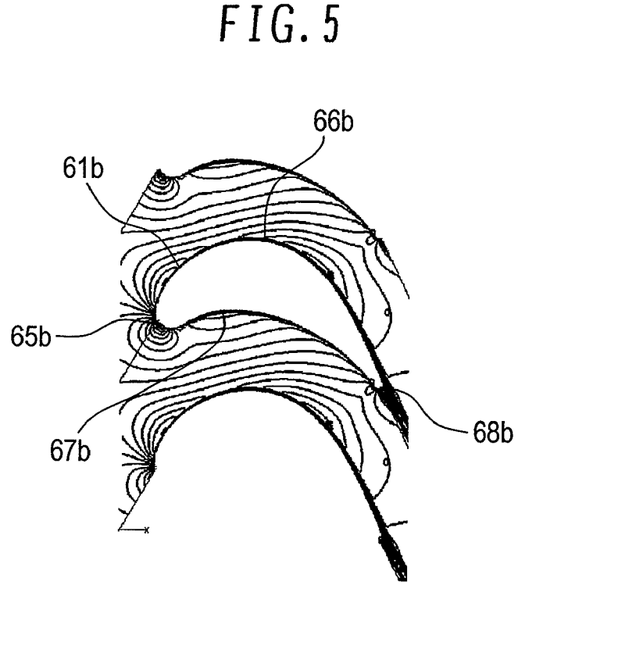
FIG. 5 illustrates the results of inter-blade flow analysis with respect to the blade of the embodiment.

FIG. 5 illustrates the results of flow analysis on the inter-blade passage configured on the basis of the airfoil profile 61b of the blade according to the present embodiment. It can be observed that the modified passage width ratio suppresses flow separation from the ventral side 67b of the airfoil profile. Thus, it is possible to reduce an aerodynamic loss that has otherwise occurred by utilizing the airfoil profile of the blade according to the present embodiment, thereby improving aerodynamic performance.

Next, a specific airfoil profile of the present invention defined on the basis of the technical concept described above is provided in Tables 1 through 7.

TABLE 1

$Z = 0.0$

| X | Y |
|---|---|
| −25.13 | −6.28 |
| −25.91 | −5.60 |
| −26.51 | −4.72 |
| −26.88 | −3.68 |
| −27.02 | −2.55 |
| −26.92 | −1.37 |
| −26.36 | 0.46 |
| −25.24 | 2.83 |
| −23.82 | 5.04 |
| −22.13 | 7.05 |
| −20.23 | 8.86 |
| −18.14 | 10.45 |
| −15.90 | 11.83 |
| −13.54 | 12.97 |
| −11.08 | 13.89 |
| −8.54 | 14.55 |
| −5.94 | 14.94 |
| −3.32 | 15.05 |
| −0.71 | 14.88 |
| 1.86 | 14.41 |
| 4.37 | 13.64 |
| 6.77 | 12.59 |
| 9.05 | 11.29 |
| 11.17 | 9.75 |
| 13.14 | 8.02 |
| 14.96 | 6.14 |
| 16.64 | 4.12 |
| 18.20 | 2.01 |
| 19.64 | −0.17 |
| 20.98 | −2.43 |
| 22.24 | −4.74 |
| 23.43 | −7.08 |
| 24.56 | −9.45 |
| 25.66 | −11.84 |
| 26.72 | −14.24 |
| 27.76 | −16.65 |
| 28.79 | −19.07 |
| 29.33 | −21.14 |
| 28.78 | −21.80 |
| 27.23 | −21.46 |
| 26.20 | −20.07 |
| 25.12 | −18.72 |
| 23.98 | −17.41 |
| 22.80 | −16.16 |
| 21.56 | 14.94 |
| 20.28 | −13.78 |
| 18.96 | −12.67 |
| 17.60 | −11.60 |
| 16.20 | −10.59 |
| 14.76 | −9.62 |
| 13.29 | −8.71 |
| 11.79 | −7.85 |
| 10.26 | −7.05 |
| 8.70 | −6.30 |
| 7.12 | −5.61 |
| 5.51 | −4.97 |
| 3.87 | −4.40 |
| 2.22 | −3.89 |
| 0.55 | −3.45 |
| −1.13 | −3.08 |

TABLE 1-continued $Z = 0.0$

| X | Y |
|---|---|
| −2.83 | −2.78 |
| −4.55 | −2.56 |
| −6.27 | −2.43 |
| −8.00 | −2.38 |
| −9.73 | −2.44 |
| −11.45 | −2.61 |
| −13.15 | −2.90 |
| −14.82 | −3.34 |
| −16.45 | −3.93 |
| −17.99 | −4.72 |
| −19.41 | −5.69 |
| −20.42 | −6.35 |
| −21.50 | −6.78 |
| −22.61 | −6.96 |
| −23.69 | −6.88 |
| −24.68 | −6.54 |

TABLE 2

$Z = 6.0$

| X | Y |
|---|---|
| −24.76 | −5.57 |
| −25.53 | −4.88 |
| −26.10 | −4.00 |
| −26.46 | −2.98 |
| −26.58 | −1.86 |
| −26.47 | −0.69 |
| −25.89 | 1.11 |
| −24.76 | 3.45 |
| −23.33 | 5.62 |
| −21.65 | 7.59 |
| −19.73 | 9.37 |
| −17.64 | 10.93 |
| −15.41 | 12.26 |
| −13.05 | 13.36 |
| −10.58 | 14.21 |
| −8.05 | 14.80 |
| −5.47 | 15.10 |
| −2.87 | 15.12 |
| −0.29 | 14.84 |
| 2.24 | 14.26 |
| 4.68 | 13.37 |
| 7.01 | 12.22 |
| 9.21 | 10.83 |
| 11.26 | 9.22 |
| 13.16 | 7.44 |
| 14.91 | 5.52 |
| 16.53 | 3.49 |
| 18.02 | 1.37 |
| 19.42 | −0.82 |
| 20.72 | −3.08 |
| 21.94 | −5.37 |
| 23.11 | −7.70 |
| 24.23 | −10.05 |
| 25.31 | −12.43 |
| 26.36 | −14.81 |
| 27.40 | −17.20 |
| 28.42 | −19.60 |
| 28.96 | −21.65 |
| 28.41 | −22.31 |
| 26.85 | −21.96 |
| 25.85 | −20.56 |
| 24.80 | −19.19 |
| 23.70 | −17.85 |
| 22.56 | −16.56 |
| 21.37 | −15.31 |
| 20.14 | −14.10 |
| 18.86 | −12.93 |
| 17.55 | −11.82 |
| 16.19 | −10.75 |
| 14.80 | −9.73 |

TABLE 2-continued

Z = 6.0

| X | Y |
|---|---|
| 13.37 | −8.76 |
| 11.91 | −7.85 |
| 10.41 | −6.98 |
| 8.88 | −6.18 |
| 7.33 | −5.44 |
| 5.74 | −4.75 |
| 4.13 | −4.13 |
| 2.49 | −3.58 |
| 0.83 | −3.10 |
| −0.84 | −2.69 |
| −2.53 | −2.36 |
| −4.24 | −2.11 |
| −5.96 | −1.95 |
| −7.68 | −1.89 |
| −9.41 | −1.93 |
| −11.13 | −2.07 |
| −12.83 | −2.35 |
| −14.50 | −2.76 |
| −16.13 | −3.33 |
| −17.68 | −4.09 |
| −19.11 | −5.04 |
| −20.11 | −5.69 |
| −21.19 | −6.10 |
| −22.28 | −6.27 |
| −23.35 | −6.17 |
| −24.32 | −5.83 |

TABLE 3

Z = 19.3

| X | Y |
|---|---|
| −23.95 | −3.98 |
| −24.67 | −3.30 |
| −25.20 | −2.44 |
| −25.52 | −1.44 |
| −25.61 | −0.35 |
| −25.47 | 0.77 |
| −24.85 | 2.52 |
| −23.70 | 4.79 |
| −22.25 | 6.89 |
| −20.55 | 8.79 |
| −18.63 | 10.47 |
| −16.53 | 11.93 |
| −14.29 | 13.15 |
| −11.93 | 14.11 |
| −9.47 | 14.81 |
| −6.96 | 15.21 |
| −4.41 | 15.32 |
| −1.87 | 15.12 |
| 0.61 | 14.60 |
| 3.02 | 13.79 |
| 5.32 | 12.68 |
| 7.48 | 11.33 |
| 9.49 | 9.77 |
| 11.36 | 8.04 |
| 13.09 | 6.17 |
| 14.68 | 4.18 |
| 16.16 | 2.10 |
| 17.54 | −0.03 |
| 18.83 | −2.23 |
| 20.05 | −4.47 |
| 21.21 | −6.74 |
| 22.33 | −9.03 |
| 23.41 | −11.35 |
| 24.46 | −13.68 |
| 25.49 | −16.01 |
| 26.50 | −18.35 |
| 27.50 | −20.70 |
| 28.03 | −22.74 |
| 27.47 | −23.40 |
| 25.91 | −23.01 |

TABLE 3-continued

Z = 19.3

| X | Y |
|---|---|
| 24.95 | −21.59 |
| 23.97 | −20.17 |
| 22.96 | −18.78 |
| 21.91 | −17.42 |
| 20.82 | −16.08 |
| 19.69 | −14.78 |
| 18.53 | −13.52 |
| 17.32 | −12.29 |
| 16.07 | −11.10 |
| 14.78 | −9.96 |
| 13.45 | −8.87 |
| 12.08 | −7.83 |
| 10.67 | −6.85 |
| 9.22 | −5.92 |
| 7.73 | −5.06 |
| 6.21 | −4.26 |
| 4.65 | −3.53 |
| 3.06 | −2.88 |
| 1.43 | −2.30 |
| −0.21 | −1.81 |
| −1.88 | −1.41 |
| −3.57 | −1.10 |
| −5.28 | −0.88 |
| −6.99 | −0.76 |
| −8.71 | −0.76 |
| −10.43 | −0.87 |
| −12.14 | −1.11 |
| −13.81 | −1.48 |
| −15.45 | −2.02 |
| −17.01 | −2.73 |
| −18.47 | −3.64 |
| −19.46 | −4.23 |
| −20.51 | −4.60 |
| −21.57 | −4.73 |
| −22.59 | −4.61 |
| −23.53 | −4.25 |

TABLE 4

Z = 38.5

| X | Y |
|---|---|
| −22.81 | −1.63 |
| −23.48 | −0.92 |
| −23.96 | −0.04 |
| −24.21 | 0.95 |
| −24.23 | 2.03 |
| −24.01 | 3.14 |
| −23.29 | 4.79 |
| −22.02 | 6.90 |
| −20.50 | 8.82 |
| −18.74 | 10.53 |
| −16.78 | 12.03 |
| −14.67 | 13.29 |
| −12.42 | 14.29 |
| −10.08 | 15.01 |
| −7.66 | 15.45 |
| −5.21 | 15.55 |
| −2.77 | 15.33 |
| −0.38 | 14.78 |
| 1.90 | 13.91 |
| 4.07 | 12.77 |
| 6.09 | 11.37 |
| 7.96 | 9.77 |
| 9.68 | 8.02 |
| 11.27 | 6.14 |
| 12.74 | 4.17 |
| 14.11 | 2.12 |
| 15.40 | 0.08 |
| 16.61 | −2.08 |
| 17.77 | −4.25 |
| 18.88 | −6.45 |

TABLE 4-continued

Z = 38.5

| X | Y |
|---|---|
| 19.95 | −8.67 |
| 20.99 | −10.90 |
| 22.01 | −13.14 |
| 23.01 | −15.38 |
| 24.00 | −17.63 |
| 24.98 | −19.89 |
| 25.95 | −22.14 |
| 26.46 | −24.15 |
| 25.89 | −24.81 |
| 24.32 | −24.37 |
| 23.42 | −22.91 |
| 22.52 | −21.46 |
| 21.60 | −20.01 |
| 20.67 | −18.57 |
| 19.71 | −17.15 |
| 18.73 | −15.74 |
| 17.72 | −11.36 |
| 16.68 | −13.00 |
| 15.60 | −11.66 |
| 14.48 | −10.37 |
| 13.32 | −9.10 |
| 12.11 | −7.89 |
| 10.86 | −6.72 |
| 9.56 | −5.60 |
| 8.21 | −4.55 |
| 6.81 | −3.57 |
| 5.36 | −2.67 |
| 3.86 | −1.82 |
| 2.31 | −1.07 |
| 0.74 | −0.41 |
| −0.89 | 0.14 |
| −2.55 | 0.57 |
| −4.23 | 0.88 |
| −5.93 | 1.08 |
| −7.64 | 1.16 |
| −9.35 | 1.11 |
| −11.06 | 0.93 |
| −12.74 | 0.61 |
| −14.38 | 0.12 |
| −15.96 | −0.53 |
| −17.43 | −1.41 |
| −18.41 | −1.97 |
| −19.46 | −2.32 |
| −20.51 | −2.43 |
| −21.51 | −2.29 |
| −22.41 | −1.90 |

TABLE 5

Z = 57.8

| X | Y |
|---|---|
| −21.78 | 0.49 |
| −22.38 | 1.22 |
| −22.78 | 2.10 |
| −22.95 | 3.10 |
| −22.88 | 4.15 |
| −22.58 | 5.19 |
| −21.75 | 6.73 |
| −20.40 | 8.69 |
| −18.83 | 10.48 |
| −17.05 | 12.06 |
| −15.11 | 13.43 |
| −13.01 | 14.54 |
| −10.78 | 15.38 |
| −8.47 | 15.90 |
| −6.10 | 16.08 |
| −3.73 | 15.90 |
| −1.43 | 15.35 |
| 0.77 | 14.48 |
| 2.83 | 13.33 |
| 4.74 | 11.91 |

TABLE 5-continued

Z = 57.8

| X | Y |
|---|---|
| 6.49 | 10.30 |
| 8.10 | 8.56 |
| 9.59 | 6.71 |
| 10.96 | 4.78 |
| 12.25 | 2.78 |
| 13.46 | 0.74 |
| 14.61 | −1.34 |
| 15.71 | −3.45 |
| 16.77 | −5.57 |
| 17.79 | −7.72 |
| 18.78 | −9.88 |
| 19.76 | −12.05 |
| 20.71 | −14.23 |
| 21.65 | −16.41 |
| 22.59 | −18.59 |
| 23.51 | −20.78 |
| 24.43 | −22.97 |
| 24.91 | −24.94 |
| 24.32 | −25.60 |
| 22.75 | −25.14 |
| 21.90 | −23.68 |
| 21.05 | −22.23 |
| 20.18 | −20.79 |
| 19.31 | −19.35 |
| 18.42 | −17.92 |
| 17.51 | −16.50 |
| 16.59 | −15.09 |
| 15.64 | −13.70 |
| 14.67 | −12.33 |
| 13.66 | −10.97 |
| 12.63 | −9.64 |
| 11.56 | −8.34 |
| 10.45 | −7.06 |
| 9.30 | −5.83 |
| 8.10 | −4.65 |
| 6.85 | −3.52 |
| 5.54 | −2.45 |
| 4.18 | −1.46 |
| 2.76 | −0.56 |
| 1.27 | 0.24 |
| −0.25 | 0.93 |
| −1.84 | 1.51 |
| −3.46 | 1.96 |
| −5.12 | 2.27 |
| −6.80 | 2.45 |
| −8.48 | 2.49 |
| −10.16 | 2.39 |
| −11.83 | 2.14 |
| −13.47 | 1.74 |
| −15.05 | 1.16 |
| −16.55 | 0.38 |
| −17.53 | −0.12 |
| −18.56 | −0.39 |
| −19.59 | −0.43 |
| −20.55 | −0.23 |
| −21.41 | 0.19 |

TABLE 6

Z = 71.0

| X | Y |
|---|---|
| −21.01 | 1.78 |
| −21.60 | 2.54 |
| −21.97 | 3.45 |
| −22.10 | 4.46 |
| −21.98 | 5.51 |
| −21.62 | 6.55 |
| −20.73 | 8.03 |
| −19.33 | 9.88 |
| −17.73 | 11.58 |
| −15.96 | 13.07 |

TABLE 6-continued

Z = 71.0

| X | Y |
|---|---|
| −14.01 | 14.35 |
| −11.92 | 15.35 |
| −9.71 | 16.06 |
| −7.42 | 16.42 |
| −5.10 | 16.40 |
| −2.82 | 15.98 |
| −0.64 | 15.20 |
| 1.39 | 14.09 |
| 3.27 | 12.71 |
| 4.99 | 11.16 |
| 6.57 | 9.46 |
| 8.02 | 7.66 |
| 9.37 | 5.77 |
| 10.63 | 3.82 |
| 11.81 | 1.83 |
| 12.93 | −0.19 |
| 14.01 | −2.25 |
| 15.03 | −4.34 |
| 16.03 | −6.44 |
| 16.99 | −8.55 |
| 17.93 | −10.67 |
| 18.86 | −12.80 |
| 19.77 | −14.94 |
| 20.67 | −17.08 |
| 21.56 | −19.22 |
| 22.45 | −21.36 |
| 23.34 | −23.51 |
| 23.79 | −25.46 |
| 23.20 | −26.11 |
| 21.63 | −25.63 |
| 20.81 | −24.19 |
| 19.99 | −22.74 |
| 19.16 | −21.30 |
| 18.32 | −19.87 |
| 17.46 | −18.44 |
| 16.60 | −17.01 |
| 15.73 | −15.59 |
| 14.83 | −14.19 |
| 13.92 | −12.80 |
| 12.99 | −11.42 |
| 12.03 | −10.06 |
| 11.04 | −8.72 |
| 10.03 | −7.41 |
| 8.97 | −6.12 |
| 7.88 | −4.87 |
| 6.74 | −3.66 |
| 5.54 | −2.50 |
| 4.30 | −1.39 |
| 2.99 | −0.36 |
| 1.62 | 0.58 |
| 0.19 | 1.43 |
| −1.29 | 2.15 |
| −2.84 | 2.74 |
| −4.44 | 3.19 |
| −6.08 | 3.48 |
| −7.74 | 3.61 |
| −9.40 | 3.57 |
| −11.05 | 3.38 |
| −12.68 | 3.02 |
| −14.25 | 2.47 |
| −15.71 | 1.69 |
| −16.71 | 1.16 |
| −17.76 | 0.87 |
| −18.81 | 0.82 |
| −19.79 | 1.03 |
| −20.64 | 1.48 |

TABLE 7

Z = 77.1

| X | Y |
|---|---|
| −20.64 | 2.35 |
| −21.23 | 3.11 |
| −21.60 | 4.03 |
| −21.72 | 5.05 |
| −21.58 | 6.12 |
| −21.20 | 7.16 |
| −20.28 | 8.62 |
| −18.86 | 10.43 |
| −17.26 | 12.08 |
| −15.48 | 13.53 |
| −13.53 | 14.76 |
| −11.44 | 15.71 |
| −9.24 | 16.35 |
| −6.96 | 16.61 |
| −4.67 | 16.48 |
| −2.44 | 15.94 |
| −0.33 | 15.05 |
| 1.62 | 13.85 |
| 3.41 | 12.41 |
| 5.05 | 10.81 |
| 6.55 | 9.07 |
| 7.94 | 7.24 |
| 9.23 | 5.34 |
| 10.43 | 3.39 |
| 11.57 | 1.39 |
| 12.66 | −0.62 |
| 13.69 | −2.67 |
| 14.69 | −4.75 |
| 15.66 | −6.83 |
| 16.60 | −8.93 |
| 17.52 | −11.03 |
| 18.43 | −13.14 |
| 19.32 | −15.26 |
| 20.20 | −17.38 |
| 21.08 | −19.51 |
| 21.95 | −21.63 |
| 22.82 | −23.76 |
| 23.26 | −25.70 |
| 22.66 | −26.35 |
| 21.10 | −25.86 |
| 20.29 | −24.42 |
| 19.48 | −22.98 |
| 18.66 | −21.54 |
| 17.84 | −20.10 |
| 17.01 | −18.67 |
| 16.17 | −17.24 |
| 15.31 | −15.82 |
| 14.44 | −14.41 |
| 13.56 | −13.02 |
| 12.65 | −11.63 |
| 11.73 | −10.26 |
| 10.78 | −8.90 |
| 9.80 | −7.56 |
| 8.79 | −6.25 |
| 7.75 | −4.97 |
| 6.66 | −3.72 |
| 5.52 | −2.51 |
| 4.34 | −1.36 |
| 3.09 | −0.26 |
| 1.78 | 0.74 |
| 0.40 | 1.66 |
| −1.03 | 2.46 |
| −2.55 | 3.13 |
| −4.12 | 3.64 |
| −5.74 | 3.99 |
| −7.39 | 4.16 |
| −9.04 | 4.16 |
| −10.69 | 3.99 |
| −12.31 | 3.63 |
| −13.87 | 3.09 |
| −15.32 | 2.30 |
| −16.32 | 1.75 |
| −17.37 | 1.45 |
| −18.42 | 1.39 |

TABLE 7-continued

Z = 77.1

| X | Y |
|---|---|
| −19.41 | 1.60 |
| −20.27 | 2.04 |

A Cartesian coordinate system of X and Y values given in Tables 1 through 7 defines the airfoil profile 61 for each cross-section. A height from the root of the airfoil profile for each cross-section is represented with symbol Z. The values for the X and Y coordinates and symbol Z are set forth in millimeters in Tables 1 through 7 although other units of dimensions may be used. In a blade of a preferable embodiment, a blade root radius is 493.9 mm, and a height from the blade root of the blade profile portion is 77.1 mm. A manufacturing tolerance is about ±2.0 mm for each of the blade root radius and the blade profile portion.

By defining X and Y coordinate values at selected locations in a Z direction normal to the X, Y plane, the fundamental contour of the airfoil profile 61 can be ascertained. By connecting the X and Y values with smooth continuing arcs, each contour section at each sectional height Z is fixed. The contours of the airfoil profiles between each cross-section are determined by smoothly connecting the adjacent cross-sections to one another to form the airfoil portion. These values represent the contours of the airfoil profile portion at ambient, non-operating or non-hot conditions and are for the uncoated airfoil portion.

The values in Tables 1 through 7 are generated and shown to the second decimal place for determining the contour of the airfoil profile portion. There are typical manufacturing tolerances as well as coatings which must be accounted for in the actual contour of the airfoil profile portion. Accordingly, the values for the contour given in Table 1 are for a reference airfoil portion. Therefore, a distance of ±2 mm in a direction normal to any surface location along the contour of the airfoil profile portion defines the contour of the airfoil profile portion for this particular blade airfoil profile portion design and turbine.

It will be appreciated that the airfoil profile portion disclosed in the above tables may be scaled up or down geometrically for use in other similar turbine designs. Consequently, the coordinate values set forth in Tables 1 through 7 may be scaled upwardly and downwardly such that the sectional shape of the airfoil profile portion remains unchanged.

The platform division angle of the blade in the present embodiment is formed parallel to the rotor disk rotating shaft but is not necessarily limited to the complete parallelism. The platform division angle of the blade may also be formed approximately parallel to the rotor disk rotating shaft.

While the invention has been described in connection with what is presently considered to be the most practical and preferred embodiment, it is to be understood that the invention is not to be limited to the disclosed embodiment. The invention may be applied to blades conforming to the conditions, including the first stage turbine blade for a gas turbine.

What is claimed is:

1. A turbine blade having a blade airfoil profile shape in an envelope within a range of ±2.0 mm in a direction normal to any surface location of an airfoil profile portion,
    wherein the airfoil profile portion has a reference airfoil contour represented in Cartesian coordinates of X, Y and Z set forth in Tables 1 through 7 wherein the X, Y and Z are distances in millimeters and the Z is a distance representing a sectional height from a root of the airfoil profile portion, the contours represented by the X and Y at each section Z being joined smoothly with one another in a blade height direction to form a complete shape of the airfoil profile portion.

2. The turbine blade according to claim 1, wherein the blade is a first stage turbine blade.

3. The turbine blade according to claim 1, wherein a divisional plane of a platform of the blade is formed approximately parallel to a direction of a turbine rotational axis.

4. A turbine blade having a non-coated reference airfoil contour portion represented in Cartesian coordinates of X, Y and Z set forth in Tables 1 through 7,
    wherein an airfoil profile portion of the turbine blade has a reference contour represented in the Cartesian coordinates of X, Y and Z set forth in Tables 1 through 7 wherein the X, Y and Z are distances in millimeters and the Z is a distance representing a sectional height from a root of the airfoil profile portion, the contours represented by the X and Y at each section Z being joined smoothly with one another in a blade height direction to form a complete shape of the airfoil profile portion, the X, Y and Z being scalable upwardly and downwardly as a function of the same constant or number.

5. The turbine blade according to claim 4, wherein the blade is a first stage turbine blade.

6. The turbine blade according to claim 4, wherein a divisional plane of a platform of the blade is formed approximately parallel to a direction of a turbine rotational axis.

7. A turbine blade having an airfoil profile portion formed such that an inter-blade passage width of a blade-root cross-section of the blade substantially monotonously decreases from a vane inlet toward a vane outlet,
    wherein the airfoil profile portion has a reference contour represented in Cartesian coordinates of X, Y and Z set forth in Tables 1 through 7 wherein the X, Y and Z are distances in millimeters and the Z is a distance representing a sectional height from a root of the airfoil profile portion,
    wherein contours represented by the X and Y at each section Z are joined smoothly with one another in a blade height direction to form a shape of the airfoil profile portion, and
    wherein each point forming the airfoil profile portion is within a range of ±2.0 mm in a direction normal to any airfoil profile surface location of the reference airfoil contour.

8. A turbine rotating body of a first stage turbine blade formed by using a blade which has a blade airfoil profile shape in an envelope within a range of ±2.0 mm in a direction normal to any surface location of an airfoil profile portion,
    wherein the airfoil profile portion has a reference airfoil contour represented in Cartesian coordinates of X, Y and Z set forth in Tables 1 through 7 wherein the X, Y and Z are distances in millimeters and the Z is a distance representing a sectional height from a root of the airfoil profile portion, the contours represented by the X and Y at each section Z being joined smoothly with one another in a blade height direction to form a complete shape of the airfoil profile portion, and
    wherein a root radius of the airfoil profile portion is 493.9 mm, a height of the airfoil profile portion of the blade from the root radius is 77.1 mm, each of the root radius and the height of the airfoil profile portion has a tolerance of ±2.0 mm, and the turbine rotating body of the first stage blade is formed of eighty-two blades.

9. A turbine rotating body of a first stage turbine blade formed by using a blade which has a non-coated reference airfoil contour portion represented in Cartesian coordinates of X, Y and Z set forth in Tables 1 through 7, wherein an airfoil profile portion of the turbine blade has a reference contour represented in the Cartesian coordinates of X, Y and Z set forth in Tables 1 through 7 wherein the X, Y and Z are distances in millimeters and the Z is a distance representing a sectional height from a root of the airfoil profile portion, contours represented by the X and Y at each section Z being joined smoothly with one another in a blade height direction to form a complete shape of the airfoil profile portion, the X, Y and Z being scalable upwardly and downwardly as a function of the same constant or number, and wherein a root radius of the airfoil profile portion is 493.9 mm, a height of the airfoil profile portion of the blade from the root radius is 77.1 mm, each of the root radius and the height of the airfoil profile portion has a tolerance of ±2.0 mm, and the turbine rotating body of the first stage blade is formed of eighty-two blades.

* * * * *